US010536031B2

(12) United States Patent
Patel et al.

(10) Patent No.: US 10,536,031 B2
(45) Date of Patent: Jan. 14, 2020

(54) SYSTEM AND METHOD FOR DISTRIBUTING LOAD CURRENT IN A UPS SYSTEM

(71) Applicant: Hitachi, Ltd., Chiyoda-ku, Tokyo (JP)

(72) Inventors: Prashant U. Patel, Bangalore (IN); T Chakridhar Reddy, Bangalore (IN); Utsav Ramchandra Patel, Gujarat (IN)

(73) Assignee: HITACHI, LTD., Tokyo (JP)

( * ) Notice: Subject to any disclaimer, the term of this patent is extended or adjusted under 35 U.S.C. 154(b) by 136 days.

(21) Appl. No.: 15/903,890

(22) Filed: Feb. 23, 2018

(65) Prior Publication Data

US 2018/0254660 A1  Sep. 6, 2018

(30) Foreign Application Priority Data

Mar. 2, 2017 (IN) .............................. 201741007402

(51) Int. Cl.
*H02J 9/06* (2006.01)
(52) U.S. Cl.
CPC .................................... *H02J 9/062* (2013.01)
(58) Field of Classification Search
CPC ....................................................... H02J 9/062
See application file for complete search history.

(56) References Cited

U.S. PATENT DOCUMENTS

| 5,596,492 A | 1/1997 | Divan et al. |
| 6,425,006 B1 * | 7/2002 | Chari ................. H04L 41/0213 370/242 |
| 6,735,704 B1 * | 5/2004 | Butka ........................ H02J 1/10 307/86 |
| 9,054,553 B2 | 6/2015 | Colombi et al. |
| 9,342,087 B2 * | 5/2016 | Chen ........................ G05F 1/56 |

(Continued)

FOREIGN PATENT DOCUMENTS

| EP | 0 315 366-61 | 12/1993 |
| EP | 0315366 B1 * | 12/1993 ............... G05F 1/59 |

(Continued)

OTHER PUBLICATIONS

"Powerware Hot Sync," EATON Corporation, www.eaton.com/powerquality, 2011, 6 pages.

(Continued)

*Primary Examiner* — Pinping Sun
(74) *Attorney, Agent, or Firm* — Foley & Lardner LLP (57) ABSTRACT

The present disclosure discloses a UPS system configured in parallel configuration. The UPS system comprises a plurality of slave UPS units, a master UPS unit comprising a controller configured to identify number of operative slave UPS units from the plurality of slave UPS units when at least one slave UPS unit from the plurality of slave UPS units is inoperative and change operating voltage of the master UPS unit based on the identified number of operative slave UPS units. The UPS system further comprises at least one slave UPS unit from the plurality of slave UPS units comprising a controller configured to monitor the operating voltage of the master UPS unit to detect the change in the operating voltage, determine the number of operative slave UPS units, calculate a slave current for supplying to the load, and initiate the slave UPS unit to supply the slave current to the load.

10 Claims, 5 Drawing Sheets

(56) References Cited

U.S. PATENT DOCUMENTS

| | | | |
|---|---|---|---|
| 2005/0043859 A1* | 2/2005 | Tsai | H02J 3/46 |
| | | | 700/286 |
| 2012/0110350 A1* | 5/2012 | Horvath | G06F 1/263 |
| | | | 713/300 |
| 2015/0022002 A1* | 1/2015 | Agrawal | H02J 9/06 |
| | | | 307/65 |
| 2015/0137604 A1* | 5/2015 | Chen | H02J 3/08 |
| | | | 307/65 |
| 2016/0048188 A1* | 2/2016 | Kim | G06F 1/3206 |
| | | | 713/323 |

FOREIGN PATENT DOCUMENTS

| | | |
|---|---|---|
| JP | H11-146575 A | 5/1999 |
| JP | 2006-318394 A | 11/2006 |
| JP | 2008-172864 A | 7/2008 |
| JP | WO2014-020644 A1 | 7/2016 |
| WO | WO-2014020644 A1 * | 2/2014 |

OTHER PUBLICATIONS

Office Action issued in Japanese Patent Application No. 2018-028314, dated Apr. 18, 2019.

* cited by examiner

SYSTEM AND METHOD FOR DISTRIBUTING LOAD CURRENT IN A UPS SYSTEM

TECHNICAL FIELD

The present disclosure relates to an Uninterrupted Power Supply (UPS) system. More specifically, but not exclusively, the present disclosure relates to a UPS system in parallel configuration and a method for distributing load current in the UPS system.

BACKGROUND

In a parallel configuration of Uninterrupted Power Supply (UPS) system, each UPS unit of the UPS system is connected to a load in parallel. A primary aim of the parallel configuration of UPS system is to share load current equally between each UPS unit. Thus, when any of the UPS unit is faulty, remaining UPS units share amount of current generated by the faulty UPS unit equally for supplying to the load. Conventional UPS systems has a common load bus and a communication line connected between each of the UPS units.

The communication line carries data which is required for equal power sharing among parallelly connected units. Typically, a UPS system comprises a master UPS unit and plurality of slave UPS units. The master UPS unit controls voltage level of common load bus. The slave units operate in current control mode to share the power based on the given reference value. Further, all UPS units are connected at common load bus.

When a slave UPS unit is faulty, the master UPS unit momentarily bears current generated by the faulty slave UPS unit. Further, the master UPS unit communicates to other slave UPS unit about number of the slave UPS down. In addition, the master UPS units communicates the amount of current to be generated by each of the remaining slave UPS units using the communication line, thereby sharing the load current equally. However, when the communication line is faulty, the conventional system does not provide a solution for sharing the load current. Hence the communication line failure affects the reliability of the system.

Figure 1:
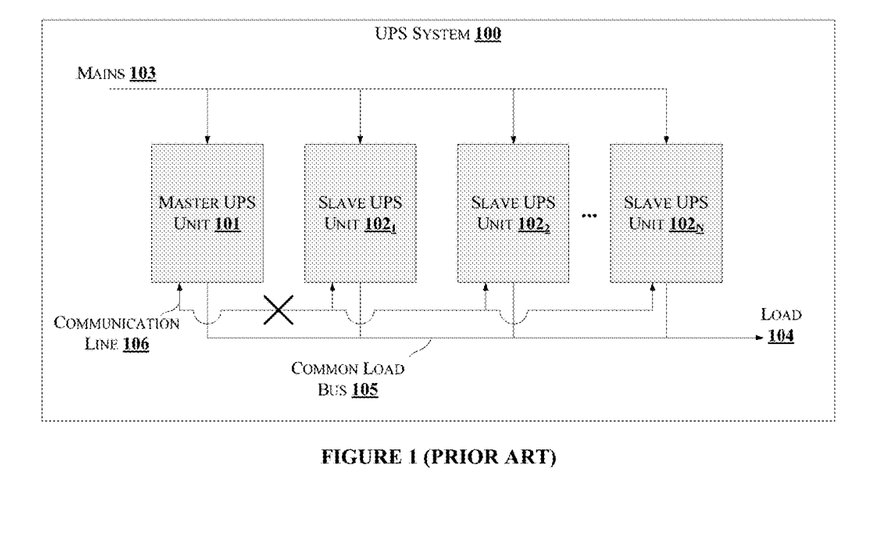
FIG. 1 shows a block diagram of a conventional UPS system for distributing load current.

FIG. 1 shows a conventional parallel UPS system 100 for distributing load current. Here, a communication line 106 is provided to connect all the UPS units. When a slave UPS unit $102_3$ is faulty, a master UPS unit 101 bears current supplied by the faulty slave UPS unit $102_3$. Now, if the communication line 106 is faulty, the UPS system 100 does not provide alternate means to communicate about faulty slave UPS units to other units in the UPS system 100. Thus, the master UPS unit 101 continues to supply additional current to a load 104. When multiple slave UPS units become faulty, and the communication line 106 is also faulty, then, the master UPS unit 101 may be overloaded by supplying current to compensate for the faulty slave UPS units 102. As a result, efficient sharing of load current does not take place in conventional UPS system 100.

The information disclosed in this background of the disclosure section is only for enhancement of understanding of the general background of the invention and should not be taken as an acknowledgement or any form of suggestion that this information forms the prior art already known to a person skilled in the art.

SUMMARY

In one embodiment, the present disclosure discloses an Uninterrupted Power Supply (UPS) system configured in parallel configuration. The UPS system comprises a plurality of slave UPS units, a master UPS unit comprising a first controller configured to identify number of operative slave UPS units from the plurality of slave UPS units when at least one slave UPS unit from the plurality of slave UPS units is inoperative and change operating voltage of the master UPS unit based on the identified number of operative slave UPS units. The UPS system further comprises at least one slave UPS unit from the plurality of slave UPS units comprising a second controller configured to monitor the operating voltage of the master UPS unit to detect the change in the operating voltage, determine the number of operative slave UPS units, calculate a slave current for supplying to the load, and initiate the slave UPS unit to supply the slave current to the load.

In one embodiment, the present disclosure discloses a method for distributing load current in an Uninterrupted Power Supply (UPS) system configured in parallel configuration. The method comprises identifying by a master UPS unit, number of operative slave UPS units from the plurality of UPS units when at least one slave UPS unit from the plurality of slave UPS units is inoperative changing the master UPS unit operating voltage based on the identified number of operative slave UPS units, monitoring, by at least on slave UPS unit, the operating voltage of the master UPS unit, determining the number of operative slave UPS units, calculating a slave current for supplying to the load, based on the number of operative salve UPS units and supplying the slave current to the load.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to an Uninterrupted Power Supply (UPS) system and a method for distributing load current in the UPS system. The UPS unit comprises a master UPS unit and plurality of slave UPS units. When at least one slave UPS unit is faulty, the master UPS unit provides a load, additional current and increases its operating voltage. An operating slave UPS unit monitors the increase in the operating voltage of the common load bus of the UPS system, and determines proportion of load current to be shared by slave unit, and generates a current for supplying to the load. Thus, the present disclosure provides a method and system for communicating using a common load bus, by varying its voltage and sharing load current equally.

Figure 2:
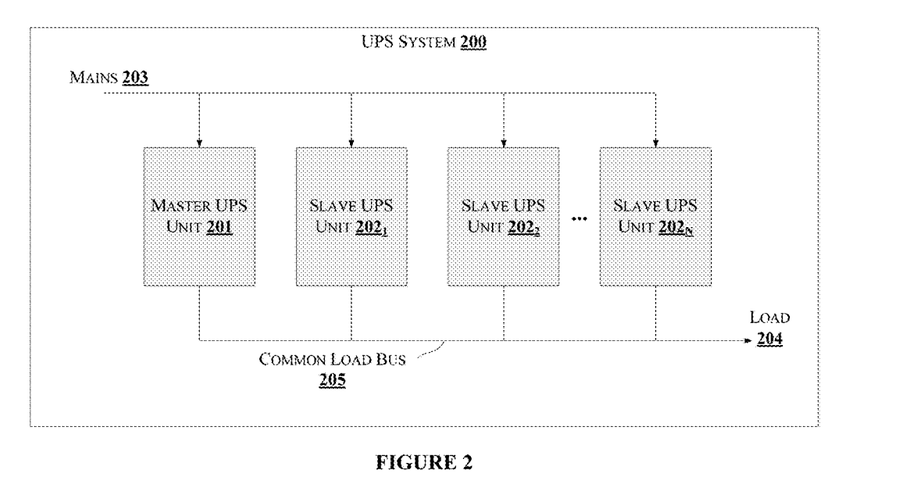
FIG. 2 shows an exemplary block diagram of a UPS system for distributing load current in accordance with some embodiments of the present disclosure.

FIG. 2 show an exemplary block diagram of a master UPS system 200 for distributing load current in accordance with some embodiments of the present disclosure. The UPS system 200 comprises a master UPS unit 201, a slave UPS unit $202_1$, a slave UPS unit $202_2$, . . . , a slave UPS unit $202_N$, mains 203, a load 204 and common load bus 205. In an embodiment, the slave UPS unit $202_1$, the slave UPS unit $202_2$, . . . , the slave UPS unit $202_N$ can be collectively represented as plurality of slave UPS units 202 in the present disclosure. In an embodiment, the UPS system 200 is configured in a parallel configuration, i.e., the master UPS unit 201 and each of the plurality of UPS units 202 are connected to the load 204. The FIG. 2 does not show a communication link connecting all the units as the present disclosure considers a scenario of a faulty communication link. The master UPS unit 201 is configured to monitor the plurality of slave UPS units 202 and provide an additional master current to the load when at least one slave UPS unit from the plurality of UPS units 202 is faulty. Further, the master UPS unit 201 determines number of operative slave UPS units and increases operating voltage accordingly. Furthermore, each of the operative slave UPS unit from the plurality of slave UPS units 202 monitors the operating voltage of the master UPS unit 201 through the common load bus 205, and determines number of operative slave UPS units by referring to a look-up table. Further, each of the operative slave UPS units calculates a slave current for supplying to the load 204 based on the number of operative slave UPS units. Thus, the additional master current is shared equally between each of the operative slave UPS units.

In an embodiment, when the master UPS unit 201 is faulty, a slave UPS unit, for example from the plurality of UPS units 202 may be considered as the master UPS unit 201. For example, if the master UPS unit 201 is faulty, then the slave UPS unit $202_1$ may be considered as the master UPS unit 201.

Figure 3:
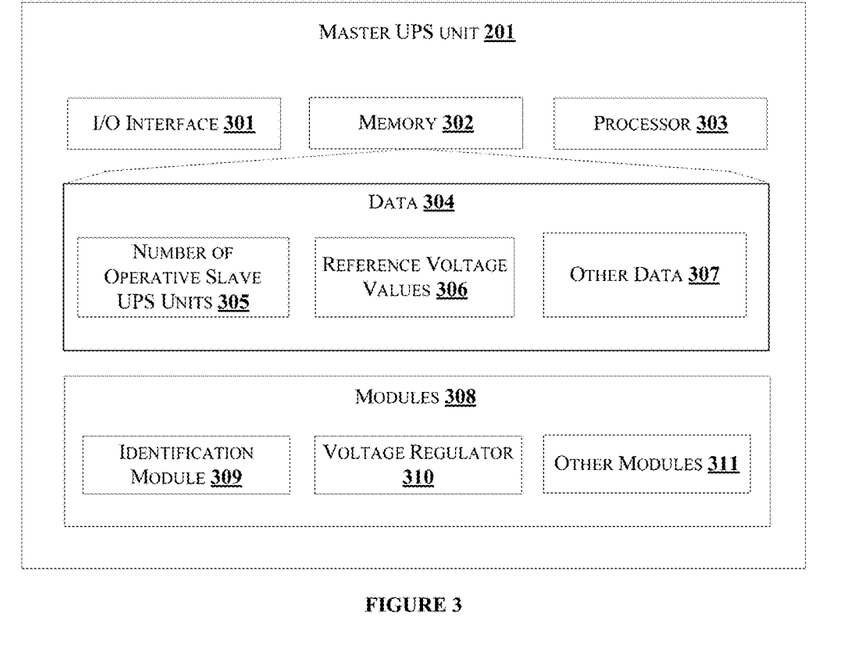
FIG. 3 shows an exemplary block diagram of a master UPS unit for distributing load current in a UPS system in accordance with some embodiments of the present disclosure.

FIG. 3 illustrates internal architecture of the master UPS unit 201, in accordance with some embodiments of the present disclosure. The master UPS unit 201 may include at least one first Central Processing Unit ("CPU" or "first processor") 303 and a memory 302 storing instructions executable by the at least one first processor 303. The first processor 303 may comprise at least one data processor for executing program components for executing user or system-generated requests. The memory 302 is communicatively coupled to the first processor 303. The master UPS unit 201 further comprises an Input/Output (I/O) interface 301. The I/O interface 301 is coupled with the first processor 303 through which an input signal or/and an output signal is communicated.

In an embodiment, data 304 may be stored within the memory 302. The data 304 may include, for example, number of operative slave UPS units 305, reference voltage values 306, and other data 307.

In an embodiment, the number of operative slave UPS units 305 indicate the number of slave UPS units from the plurality of UPS units 202 supplying current to the load 204.

In an embodiment, the reference voltage values 306 indicate voltage values to which operating voltage of the master UPS unit 201 may be increased based on the number of operative slave UPS units 305. Here, the reference voltage values 306 correspond to the number of operative slave UPS units 305.

In an embodiment, the other data 307 may include but are not limited to, number of inoperative slave UPS units from the plurality of slave UPS units 302.

In an embodiment, the data 304 in the memory 302 is processed by modules 308 of the master UPS unit 201. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 308 when configured with the functionality defined in the present disclosure will result in a novel hardware.

In one implementation, the modules 308 may include, for example, an identification module 309, a voltage regulator 310 and other modules 311. It will be appreciated that such aforementioned modules 308 may be represented as a single module or a combination of different modules.

In an embodiment, the identification module 309 identifies number of operative slave UPS units 305 in the UPS system 200. In an embodiment, the master UPS unit 201 is provided with information including number of plurality slave UPS units 202. When at least one slave UPS unit is faulty, the current of the master UPS unit 201 increases momentarily. Here, the increase in the master current is proportional to number of inoperative slave UPS units. Thus, the master UPS unit 201 determines number of inoperative slave UPS units from the plurality of UPS units 202 based on increase in the master current. Further, the master UPS unit 201 identifies number of operative slave UPS units based on the number of plurality of slave UPS units 202 and number of inoperative slave UPS units.

In an embodiment, the voltage regulator 310 receives the number of operative slave UPS units 305 from the identification module 309. Further, the voltage regulator 310 increases operating voltage of the master UPS unit 201 based on a look-up table. An exemplary look-up table is as given in Table 1.

TABLE 1

| Master current during slave failure Amps (A) | Number of operating slave UPS units | Reference Operating voltage of master UPS unit in volts (v) |
|---|---|---|
| 50 | 7 | 240 |
| 100 | 6 | 242 |
| 150 | 5 | 244 |

Consider a 7+1 configuration UPS system 200 having 1 Master and 7 slave units, where each of the UPS units equally supply a current of 50 A to a load requiring a current of 400 A. The lookup table for the 7+1 UPS is as shown in Table 1, when the master current is 50 A, then the master UPS unit 201 determines that the number of operative slave UPS units 305 is 7. Thus, the operating voltage of the master UPS unit 201 is set to 240 v. Likewise, when the master current increases, the number of operative slave UPS units 305 is determined as given in the Table 1. Further, reference voltage value of the master UPS unit 201 corresponding to the number of operative slave UPS unit 305 is determined and the operating voltage is set to the determined reference voltage value 306.

Figure 4:
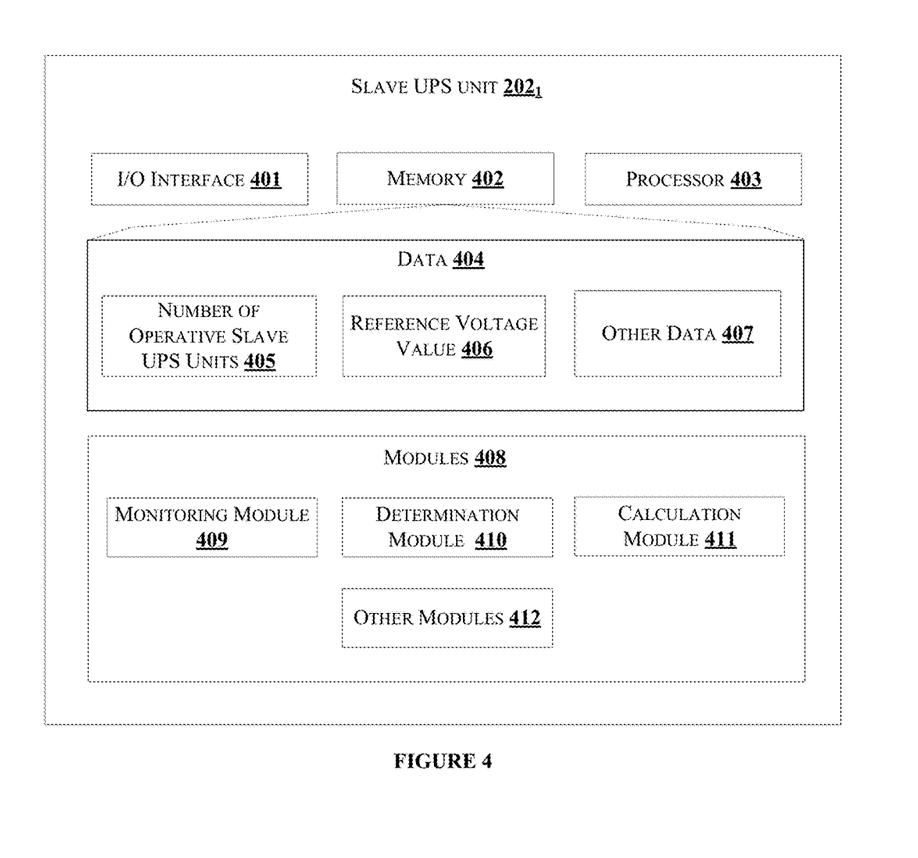
FIG. 4 shows an exemplary block diagram of a slave UPS unit for distributing load current in a UPS system in accordance with some embodiments of the present disclosure.

FIG. 4 illustrates internal architecture of a slave UPS unit, in accordance with some embodiments of the present disclosure. For illustration let us consider the slave UPS unit 202₁ for describing foregoing embodiments. The slave UPS unit 202₁ may include at least one second Central Processing Unit ("CPU" or "second processor") 403 and a memory 402 storing instructions executable by the at least one second processor 403. The second processor 403 may comprise at least one data processor for executing program components for executing user or system-generated requests. The memory 402 is communicatively coupled to the second processor 403. The slave UPS unit 202₁ further comprises an Input/Output (I/O) interface 401. The I/O interface 401 is coupled with the second processor 403 through which an input signal or/and an output signal is communicated.

In an embodiment, data 404 may be stored within the memory 402. The data 404 may include, for example, number of operative slave UPS units 405, reference voltage values 406, and other data 407.

In an embodiment, the number of operative slave UPS units 405 indicate the number of slave UPS units from the plurality of UPS units 202 supplying current to the load 204.

In an embodiment, the reference voltage values 406 indicate a range of voltage values to which the operating voltage of the master UPS unit 201 corresponds. Based on the range within which the operating voltage corresponds, the number of operative slave UPS units 405 is determined.

In an embodiment, the data 404 in the memory 402 is processed by modules 408 of the slave UPS unit 202₁. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 408 when configured with the functionality defined in the present disclosure will result in a novel hardware.

In one implementation, the modules 408 may include, for example, a monitoring module 409, a determination module 410, a calculation module 411 and other modules 412. It will be appreciated that such aforementioned modules 408 may be represented as a single module or a combination of different modules.

In an embodiment, the monitoring module 409 monitors the operating voltage of the master UPS unit 201. Here, the monitoring module 409 monitors the operating voltage through the common load bus common load bus 205. The monitoring module 409 receives the operating voltage of the master UPS unit 201 at predefined intervals of time. In an embodiment, the monitored operating voltage of the master UPS unit 201 is the reference voltage values 306.

In an embodiment, the determination module 410 receives the monitored operating voltage of the master UPS unit 201. Further, the determination module 410 relates the monitored operating voltage with the reference voltage values 406. The reference voltage values 406 include ranges of voltage values 406. In an embodiment, the monitored voltage value falls in a range of the reference voltage values 406. Once the range of the reference voltage values 406 corresponding to the monitored operating voltage is determined, the determining module 410 determines the number of operative slave UPS units 405 corresponding to the range of the reference voltage values 406. The relationship of the monitored operating voltage, the reference voltage values 406 and the number of operative UPS units 405 for the aforementioned 7+1 configuration UPS system is given in Table 2.

TABLE 2

| Master operating voltage in volts (v) | Reference voltage values in volts (v) | Number of operating slave UPS units |
|---|---|---|
| 240 | 239-241 | 7 |
| 242 | 241-243 | 6 |
| 244 | 243-245 | 5 |

From Table 2, the monitored operating voltage of the master UPS unit 201 of 240 v falls within the range of 239 v-241 v. Thus, the determination module 410 determines the number of operative slave UPS units 405 corresponding to the range 239 v-241 v. Let the determination module 410 receive a monitored operating voltage of 244 v. The voltage 244 v falls within the range of 243 v-245 v. Thus, the determination module determines the number of operating slave UPS units 405 as 5 from the Table 2, which corresponds to the reference voltage values 406 of 243 v-245 v.

In an embodiment, the calculation module 411 receives the number of operative slave UPS units 405 from the determination module 410. Then, the calculation module 411 calculates a slave current for supplying to the load 204 based on the number of operative slave UPS units 405. The slave current is calculated using the formula:

$$I_{Slave} = I_{Load}/N+1 \tag{1}$$

Where, $I_{Load}$=load current;

N=number of operative slave UPS units 405; and $I_{Slave}$=slave current.

Once the slave current is calculated, the second processor 403 initiates the slave UPS unit $202_1$ to supply the slave current to the load 204. The term N+1 indicates inclusion of the master UPS unit 201 along with the operative slave UPS units.

In an embodiment, when the load current is equally shared, load bus voltage is restored at rated voltage by the master unit 201.

Figure 5:
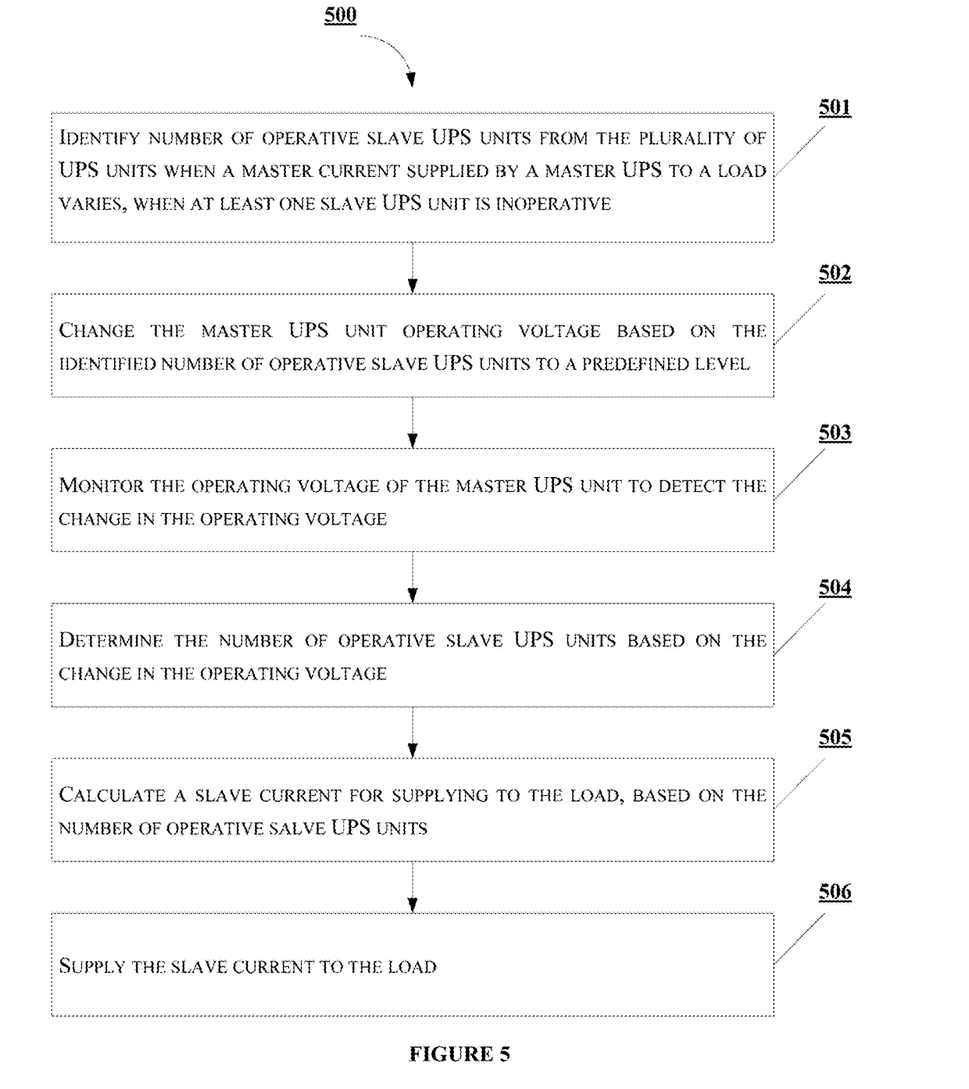
FIG. 5 shows a flow chart illustrating method steps for distributing load current in a UPS system in accordance with some embodiments of the present disclosure.

FIG. 5 shows a flow chart illustrating a method for distributing load current in an UPS system 200 in accordance with some embodiments of the present disclosure.

As illustrated in FIG. 5, the method 500 may comprise one or more steps for distributing load current in an UPS system 200 in accordance with some embodiments of the present disclosure. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 501, the identification module 309 identifies the number of operative slave UPS units 305 in the UPS system 200. When at least one slave UPS unit is faulty, the master UPS unit 201 momentarily increases the master current. Here, the increase in the master current is proportional to number of inoperative slave UPS units. Thus, the master UPS unit 201 determines number of inoperative slave UPS units from the plurality of UPS units 202 based on increase in the master current. Further, the master UPS unit 201 identifies number of operative slave UPS units based on the number of plurality of slave UPS units 202 and number of inoperative slave UPS units.

At step 502, the voltage regulator 310 sets the operating voltage of the master UPS unit 201 based on the relation given in Table 1. Further a master unit maintains the voltage level for a pre-set time interval to avoid false voltage detection.

At step 503, the monitoring module 409 monitors the operating voltage of the master UPS unit 201. In an embodiment, the monitoring module 409 draws the operating voltage of the master UPS unit 201 through the common load bus 205 at predefined intervals of time.

At step 504, the determination module 410 receives the monitored operating voltage of the master UPS unit 201 from the monitoring module 409. Further, the determination module 410 determines the number of operative slave UPS unit 405 by relating the monitored operating voltage with the reference voltage values 406 as shown in Table 2.

At step 505, the calculation module 411 calculates the slave current based on the number of operative slave UPS units 405 using the equation 1.

At step 506, the second processor 403 initiates a current generation module (not shown in figure) of the slave UPS unit $202_1$ to supply the calculated slave current to the load 204.

In an embodiment, the step of 504 to step 506 is performed by each of the operative slave UPS unit.

Referring to FIG. 2, let the UPS system 200 comprise a master UPS unit 201, a slave UPS unit $202_1$, a slave UPS unit $202_2$ and a slave UPS unit $202_3$. Let the master current supplied by the master UPS unit 201 be 50 A. Let the slave current $I_{Slave}$ supplied by the slave UPS unit $202_1$, the slave UPS unit $202_2$ and the slave UPS unit $202_3$ be 50 A. Thus, the load current $I_{Load}$ is 200 A. When each of the UPS units of the UPS system 200 is supplying an equal amount of current, the load current is said to be equally distributed. Let us consider that the slave UPS unit $202_3$ is at fault. Here, the master current increases by a value equal to the slave current $I_{Slave}$ supplied by the slave UPS unit $202_3$. Thus, the master current increases to 100 A. Further, the identification module 309 refers to a table generated for the master UPS unit 201 of the UPS system 200 for identifying the number of operative slave UPS units 305. Table 3 is a custom table for the UPS system 200.

TABLE 3

| Master current in Amps (A) | Number of operating slave UPS units | Reference Operating voltage of master UPS unit in volts (v) |
|---|---|---|
| 50 | 7 | 240 |
| 100 | 6 | 242 |
| 150 | 5 | 244 |

Referring to Table 3, the identification module 309 identifies the number of slave UPS units as 2 as the master current is 100 A. Further, the voltage regulator 310 increases the operating voltage of the master UPS unit 201 to the reference voltage value 306 corresponding to the number of operative slave UPS units 305 in Table 3. Thus, the voltage regulator 310 sets the operating voltage of the master UPS unit 201 to 242 v. The monitoring module 409 monitors the operating voltage of the master UPS unit 201. When a change is detected in the operating voltage of the operating voltage, the monitoring unit 409 provides the monitored operating voltage to the determination unit 410. Here, when the operating voltage of the master UPS unit 201 changes from 240 v to 242 v, the monitoring unit 409 provides the monitored operating voltage, i.e., 242 v value to the determination unit 411. The determination unit 411 refers to a table generated for the slave UPS unit 202 of the UPS system 200 as. Let Table 4 represent the table generated for the slave UPS unit 202.

TABLE 4

| Master operating voltage in volts (v) | Reference voltage values in volts (v) | Number of operating slave UPS units |
|---|---|---|
| 240 | 239-241 | 7 |
| 242 | 241-243 | 6 |
| 244 | 243-245 | 5 |

Consider 7+1 configuration UPS system where each of the UPS units are supplying 50 A to a load requirement of 400 A. Consider a scenario where a slave unit $202_7$ fails. Now, the master current increases from 50 A to 100 A. Referring to the Table 4, the determination unit 410 relates the operating voltage of 242 v with the reference voltage values 406 as shown in Table 4. The operating voltage of 242 v falls in the range of 241 v-243 v. Further, the determination module 410 determines the number of operative slave UPS units 405 as 6 by referring to the Table 4. Then, the calculation module

411 calculates the slave current $I_{Slave}$ using the equation 1. In this scenario, the $I_{Load}$=400 A; and N=6. Thus, the $I_{Slave}$ is calculated to be 57.14 A. However, the current supplied by the slave UPS unit $202_1$ to $202_6$ is 50 A. Thus, the slave UPS unit $202_1$ and the slave UPS unit $202_2$ generates an additional current of 7.14 A each. Therefore, the $I_{Slave}$ of the slave UPS unit $202_1$ and the $I_{Slave}$ of the slave UPS unit $202_2$ is 57.14 A each. The generated $I_{Slave}$ is supplied to the load 204. When the $I_{Slave}$ of 57.14 A is supplied by the slave UPS unit $202_1$ and the slave UPS unit $202_2$, the amount of master current supplied by the master UPS unit 201 to the load 204 decreases by a value proportional to the increase in $I_{slave}$ of the slave UPS unit $202_1$ to $202_6$. In this illustration, the master current decreases by a value of 7.14*6=42.84 A. Thus, the master current reduces to 57.14 A. As a result, the load current $I_{Load}$ is equally distributed among operative UPS units of the UPS system 200.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure discloses a UPS system and a method for distributing load current without a need of a dedicated communication line. The present disclosure utilises existing common load bus to communicate current requirements from each UPS unit of the UPS system for distributing load current equally.

In an embodiment, the present disclosure provides a solution for sharing load voltage equally, without addition of cost and hardware to the UPS system.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
|---|---|
| 200 | UPS system |
| 201 | Master UPS unit |
| 202 | Slave UPS unit |
| 203 | Mains |
| 204 | Load |
| 205 | Common load bus |
| 301 | I/O interface of master UPS unit |
| 302 | Memory of master UPS unit |
| 303 | First processor |
| 304 | Data of master UPS unit |
| 305 | Number of operative slave UPS units for master UPS unit |
| 306 | Reference voltage value for master UPS unit |
| 307 | Other data of master UPS unit |
| 308 | Modules of master UPS unit |
| 309 | Identification module |
| 310 | Voltage regulator |
| 311 | Other module of master UPS unit |
| 401 | I/O interface of slave UPS unit |
| 402 | Memory of slave UPS unit |
| 403 | Second processor |
| 404 | Data of slave UPS unit |
| 405 | Number of operative slave UPS units for slave UPS unit |
| 406 | Reference voltage values for slave UPS unit |
| 407 | Other data of slave UPS unit |
| 408 | Modules of slave UPS unit |
| 409 | Monitoring module |
| 410 | Determination module |
| 411 | Calculation module |
| 412 | Other modules of slave UPS unit |

We claim:

1. An Uninterrupted Power Supply (UPS) system configured in parallel configuration, comprising:
    a plurality of slave UPS units;
    a master UPS unit comprising a first controller configured to:
        identify a number of operative slave UPS units from the plurality of slave UPS units when a master current supplied by the master UPS to a load varies, when at least one slave UPS unit from the plurality of slave UPS units is inoperative; and
        change operating voltage of the master UPS unit based on the identified number of operative slave UPS units to a predefined level;
    and
    at least one slave UPS unit from the plurality of slave UPS units comprising a second controller configured to:

monitor the operating voltage of the master UPS unit to detect the change in the operating voltage;

determine the number of operative slave UPS units based on the change in the operating voltage;

calculate a slave current for supplying to the load, based on the number of operative salve UPS units; and initiate the slave UPS unit to supply the slave current to the load.

2. The UPS system as claimed in claim 1, wherein the inoperativeness of the at least one slave UPS unit is identified from a first look-up table.

3. The UPS system as claimed in claim 2, wherein the first look-up table provides the number of operating slave UPS units and corresponding change in the operating voltage.

4. The UPS unit as claimed in claim 1, wherein the number of operative slave UPS units is determined based on a second look-up table by the at least one slave UPS unit.

5. The UPS unit as claimed in claim 4, wherein the second look-up table provides the number of operating slave UPS units and corresponding change in the operating voltage.

6. A method for distributing load current in an Uninterrupted Power Supply (UPS) system configured in parallel configuration, comprising a master UPS unit, and a plurality of slave UPS units, the method comprising:

identifying by the master UPS unit, a number of operative slave UPS units from the plurality of UPS units when a master current supplied by the master UPS to a load varies, when at least one slave UPS unit from the plurality of slave UPS units is inoperative;

changing the master UPS unit operating voltage based on the identified number of operative slave UPS units to a predefined level;

monitoring, by at least on slave UPS unit from the plurality of slave UPS units, the operating voltage of the master UPS unit to detect the change in the operating voltage;

determining, by the at least one slave UPS unit, the number of operative slave UPS units based on the change in the operating voltage;

calculating, by the at least one slave UPS unit, a slave current for supplying to the load, based on the number of operative salve UPS units; and supplying, by the at least one slave UPS unit, the slave current to the load.

7. The method as claimed in claim 6, wherein the inoperativeness of the at least one slave UPS unit is identified from a first look-up table.

8. The method as claimed in claim 7, wherein the first look-up table provides the number of operating slave UPS units and corresponding change in the operating voltage.

9. The method as claimed in claim 6, wherein the number of operative slave UPS units is determined based on a second look-up table by the at least one slave UPS unit.

10. The method as claimed in claim 9, wherein the second look-up table provides the number of operating slave UPS units and corresponding change in the operating voltage.

* * * * *